Oct. 24, 1944.  L. J. HIBBARD  2,361,200
CONTROL SYSTEM
Filed Nov. 19, 1942  2 Sheets-Sheet 1
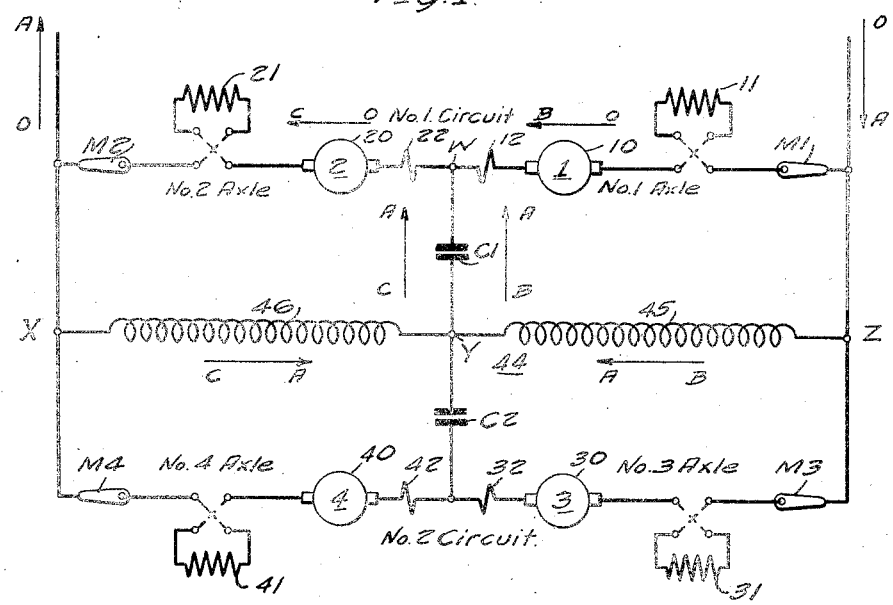
INVENTOR
Lloyd J. Hibbard.

Patented Oct. 24, 1944

2,361,200

UNITED STATES PATENT OFFICE 2,361,200

CONTROL SYSTEM

Lloyd J. Hibbard, Forest Hills, Pa., assignor to Westinghouse Electric & Manufacturing Company, East Pittsburgh, Pa., a corporation of Pennsylvania Application November 19, 1942, Serial No. 466,138

10 Claims. (Cl. 172—179)

My invention relates, generally, to control systems and, more particularly, to systems for controlling the slipping of the driving wheels of electrically propelled locomotives and vehicles.

As explained in my copending application Serial No. 466,137, filed November 19, 1942, it is necessary to provide some means for controlling the slipping speed of a locomotive or vehicle axle, otherwise the speed may become dangerous to the motor driving the slipping axle. In my aforesaid copending application, several schemes are described for controlling the slipping of traction motors which are connected in series or in series-parallel circuit relation.

An object of the present invention is to provide additional schemes for controlling the slipping of traction motors.

A more specific object of my invention is to provide for automatically reducing the voltage across the motor which drives the slipping axle of a locomotive or vehicle when the slip speed increases relative to the other axle speeds.

Other objects of my invention will be explained fully hereinafter or will be apparent to those skilled in the art.

In accordance with the present invention, provision is made for so connecting either resistance, reactance or capacitance means in the motor circuits that a definite reduction in the voltage across the slipping motor is produced as the speed of the slipping motor increases relative to the speed of the other motors and tractive effort load is transferred to the associated nonslipping motors of a locomotive or other railway vehicle.

For a fuller understanding of the nature and objects of the present invention, reference may be had to the following detailed description, taken in conjunction with the accompanying drawings, in which:

Figure 1 is a schematic diagram of a control system embodying my invention;

Fig. 2 is a vector diagram showing the value and the phase position of various currents and voltages in the motor circuits;

Figures 3, 4:
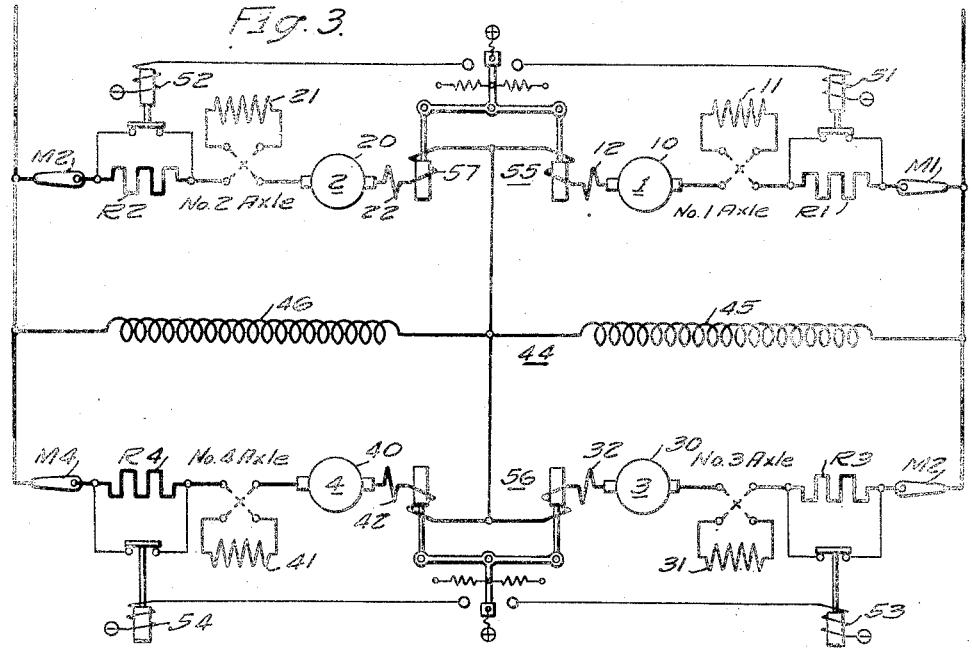
Fig. 3 is a schematic diagram of a modification of the invention.
Fig. 4 is a schematic diagram of another modification of the invention.

Referring to the drawings, and particularly to Fig. 1, the system shown therein comprises a pair of traction motors 1 and 2 which are connected in series-circuit relation and a similar pair of motors 3 and 4 also connected in series-circuit relation. The two groups of motors are connected in parallel-circuit relation across the power source, thereby forming the well-known series-parallel arrangement commonly used on railway locomotives.

The motor 1 is provided with an armature winding 10, a main field winding 11 and an auxiliary or commutating field winding 12. The motor 2 is provided with an armature winding 20, a main field winding 21 and an auxiliary or commutating field winding 22. Likewise, the motor 3 is provided with an armature winding 30, a main field winding 31 and a commutating field winding 32. The motor 4 is provided with an armature winding 40, a main field winding 41 and a commutating field winding 42. Disconnecting switches M1, M2, M3 and M4 are provided for disconnecting either group of motors from the power source.

It will be understood that the motors may be energized from a suitable source of power through a power transformer in a manner well known in the art. The usual method of controlling the voltage applied to the motors by a plurality of tap-changing switches may be utilized.

As explained hereinbefore, it has been found necessary to provide some means for controlling the slipping of the axles driven by the motors when two or more motors are connected in series-circuit relation. When one axle starts slipping, the voltage of the motor which drives that axle increases, thereby robbing voltage from the other motor which is connected in series with the slipping motor, and if the slipping is not controlled, the action becomes cumulative and the slipping motor may attain a dangerous speed.

As described in my aforesaid copending application, the wheel slippage may be controlled by providing a balancing transformer or antislip preventive coil comprising a pair of windings which are wound in mutually inductive relation and having a 1:1 ratio. The windings of the balancing transformer are so connected across the motors that the voltage, and hence the speed, of the slipping motor are prevented from rising to dangerous values.

As shown in Fig. 1, such a balancing transformer 44 having a pair of windings 45 and 46, is provided in the present system. The winding 45 is connected in parallel-circuit relation to the motors 1 and 3 and the winding 46 is connected in parallel-circuit relation to the motors 2 and 4.

As explained in my aforesaid copending application, if one of the motors, for example the motor 1, starts to slip, the increase in the voltage of the motor 1 causes a current to flow through the winding 45. This current causes an equal current to flow in the winding 46 which causes a circulating current to flow through the motor 2, thereby increasing the current and the tractive effort of the motor 2 relative to the motor 1. In this manner, the tractive effort of the slipping motor 1 is decreased and the tractive effort of the nonslipping motor 2 is increased, thereby tending to stop the slipping condition.

With a view toward still further aiding in stopping the slipping condition, I have provided a condenser C1 in the parallel connection between the mid-points of the transformer windings and the motors 1 and 2. A similar condenser C2 is also provided between the mid-points of the transformer and the motors 3 and 4. As illustrated by the vector diagram in Fig. 2, which illustrates the conditions resulting from a slipping of the motor 1, the condenser C1 produces an $X_cI$ drop which overcomes the reactive or $XI$ drop of the transformer winding. The condenser C1 may be made of suitable capacitance to actually cause an increase in the terminal volts of the motor on the #2 axle, thereby decreasing the terminal volts of the motor on the #1 axle, which is the slipping axle. In this manner, the voltage of the slipping motor may be automatically reduced while the voltage of the nonslipping motor is increased, thereby stopping the slipping condition.

It will be understood that the condenser C2 functions in a similar manner in the event that either the #3 or the #4 axle starts slipping. Furthermore, it will be understood that the present system will function with either one or both groups of motors connected in the power circuit by means of the switches M1, M2, M3 and M4.

In the modification of the invention shown in Fig. 3, in which like parts are designated by the same reference characters as in Fig. 1, resistors R1, R2, R3 and R4 are disposed in the circuits for the motors 1, 2, 3 and 4, respectively. Under normal operating conditions, the resistors R1, R2, R3 and R4 are shunted by switches 51, 52, 53 and 54, respectively. A relay 55 is provided in the circuit for the motors 1 and 2 and a similar relay 56 is provided in the circuit for the motors 3 and 4. The relays 55 and 56 may be of the balanced-beam type, each relay having a pair of actuating coils one of which is connected inside of the parallel connections between each motor and one of the windings of the balancing transformer 44. As explained hereinbefore, a slipping of one of the axles driven by one of the motors results in an unbalanced condition of both the motor voltage and the motor currents. Thus, the relays 55 and 56 may be said to be responsive to an unbalance of either the motor voltage or the motor currents.

Assuming that the motor driving the #1 axle starts to slip, the voltage of this motor increases, which causes a current to flow through the winding 45 of the balancing transformer 44, thereby causing a circulating current to flow through the winding 46 and the motor 2. The increase in current through a winding 57 of the relay 55 operates the relay in a direction to energize an actuating coil of the switch 51, thereby opening the contact members of this switch to insert the resistor R1 in the circuit for the motor 1. The insertion of the resistor R1 decreases the voltage applied to the motor 1, thereby reducing its speed and stopping the slipping condition.

Similar results will be obtained in the event of the slipping of any one of the other axles. Thus, in the event of the slipping of the #2 axle, the relay 55 is operated in the opposite direction to energize the switch 52 and insert the resistor R2 in series with the motor driving the #2 axle. Likewise, in the event of the slipping of either the #3 or the #4 axle, the relay 56 is operated in a direction to insert the proper resistor in series with the slipping motor.

The system shown in Fig. 4 is similar to that illustrated in Fig. 3 with the exception that external reactors RX1, RX2, RX3 and RX4 are provided in place of the external resistors. In the event of the slipping of any one of the motors, the relay 55 or the relay 56 will be operated to cause the insertion of the proper reactor in series with the slipping motor, thereby decreasing the voltage on that motor and stopping the slipping condition.

From the foregoing description, it is apparent that I have provided for automatically reducing the voltage across the motor which drives the slipping axle of a railway vehicle, thereby stopping the slipping condition and quickly restoring the motors to normal operation. The present system may be utilized when the motors are connected for either series or series-parallel operation.

Since numerous changes may be made in the above described construction and different embodiments of the invention may be made without departing from the spirit and scope thereof, it is intended that all matter contained in the foregoing description or shown in the accompanying drawings shall be interpreted as illustrative and not in a limiting sense.

I claim as my invention:

1. In a control system, in combination, a plurality of electric motors connected in series-circuit relation, a balancing transformer having a plurality of windings connected in series-circuit relation, means for connecting each of said windings in parallel-circuit relation to at least one of said motors, and voltage-controlling means disposed in the motor circuits for varying the relative voltages of said motors under an unbalanced condition of the motor currents.

2. In a control system, in combination, a plurality of electric motors connected in series-circuit relation, a balancing transformer having a plurality of windings connected in series-circuit relation, means for connecting each of said windings in parallel-circuit relation to at least one of said motors, and voltage-controlling means disposed in the motor circuits for reducing the voltage of one of said motors relative to the voltage of the other motors under an unbalanced condition of the motor currents.

3. In a control system, in combination, a plurality of electric motors connected in series-circuit relation, each of said motors having an armature winding, a main field winding and an additional field winding, a balancing transformer having a plurality of windings connected in series-circuit relation, means for connecting each of said motors in parallel-circuit relation to one of said windings, the parallel connections for each motor including the armature winding, the main field winding and the additional field winding, and voltage controlling means disposed in the motor circuits for varying the relative voltages of said motors under an unbalanced condition of the motor currents.

4. In a control system, in combination, a plurality of electric motors connected in series-circuit relation, each of said motors having an armature winding, a main field winding and at least one additional field winding, a balancing transformer having a plurality of windings connected in series-circuit relation, means for connecting each of said windings in parallel-circuit relation to at least one of said motors, the parallel connections for each motor including the armature winding and all of the field windings of said motor, and voltage controlling means disposed in the motor circuits for varying the relative voltages of said motors under an unbalanced condition of the motor currents.

5. In a control system, in combination, a plurality of electric motors connected in series-circuit relation, a balancing transformer having a plurality of windings connected in series-circuit relation, means for connecting each of said windings in parallel-circuit relation to at least one of said motors, and capacitance means disposed in the motor circuits for varying the relative voltages of said motors under an unbalanced condition of the motor currents.

6. In a control system, in combination, a plurality of electric motors connected in series-circuit relation, each of said motors having an armature winding, a main field winding and at least one additional field winding, a balancing transformer having a plurality of windings connected in series-circuit relation, means for connecting each of said windings in parallel-circuit relation to at least one of said motors, the parallel connections for each motor including the armature winding and all of the field windings of said motor, and capacitance means disposed in the motor circuits for varying the relative voltages of said motors under an unbalanced condition of the motor currents.

7. In a control system, in combination, a plurality of electric motors connected in series-circuit relation, each of said motors having an armature winding, a main field winding and at least one additional field winding, a balancing transformer having a plurality of windings connected in series-circuit relation, means for connecting each of said windings in parallel-circuit relation to at least one of said motors, the parallel connections for each motor including the armature winding and all of the field windings of said motor, and capacitance means disposed in the parallel connections for the motors to reduce the voltage of one of said motors under an unbalanced condition of the motor currents.

8. In a control system, in combination, a plurality of electric motors connected in series-circuit relation, a balancing transformer having a plurality of windings connected in series-circuit relation, means for connecting each of said windings in parallel-circuit relation to one of said motors, switching means for inserting voltage controlling means in series-circuit relation with each motor, and relay means responsive to an unbalance in the motor currents for controlling the operation of said switching means.

9. In a control system, in combination, a plurality of electric motors connected in series-circuit relation, a balancing transformer having a plurality of windings connected in series-circuit relation, means for connecting each of said windings in parallel-circuit relation to one of said motors, a resistor disposed in the series circuit for each motor, switching means for normally shunting said resistors from the motor circuits, and relay means responsive to an unbalance in the motor currents for selectively operating said switching means to insert one of said resistors in series-circuit relation with one of said motors.

10. In a control system, in combination, a plurality of electric motors connected in series-circuit relation, a balancing transformer having a plurality of windings connected in series-circuit relation, means for connecting each of said windings in parallel-circuit relation to one of said motors, a reactor disposed in the series circuit for each motor, switching means for normally shunting said reactors from the motor circuit, and relay means responsive to an unbalance in the motor currents for selectively operating said switching means to insert one of said reactors in series-circuit relation with one of said motors.

LLOYD J. HIBBARD.